United States Patent
Ma

(10) Patent No.: US 8,737,205 B2
(45) Date of Patent: *May 27, 2014

(54) WEIGHT-BASED BANDWIDTH ALLOCATION FOR NETWORK TRAFFIC

(75) Inventor: Qingming Ma, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 332 days.

This patent is subject to a terminal disclaimer.

(21) Appl. No.: 13/156,163

(22) Filed: Jun. 8, 2011

(65) Prior Publication Data

US 2011/0235653 A1  Sep. 29, 2011

Related U.S. Application Data

(63) Continuation of application No. 11/433,364, filed on May 15, 2006, now Pat. No. 7,983,299.

(51) Int. Cl.
*G01R 31/08* (2006.01)
(52) U.S. Cl.
USPC .............................. 370/229; 370/401; 709/238
(58) Field of Classification Search
USPC ................. 370/229–240, 389–427, 438–440, 370/468–479, 118
See application file for complete search history.

(56) References Cited

U.S. PATENT DOCUMENTS

| | | | |
|---|---|---|---|
| 6,996,062 B1 * | 2/2006 | Freed et al. .................... | 370/235 |
| 7,082,102 B1 | 7/2006 | Wright | |
| 2001/0026535 A1 | 10/2001 | Amou et al. | |
| 2002/0181484 A1 * | 12/2002 | Aimoto ......................... | 370/413 |
| 2003/0103450 A1 | 6/2003 | Chapman et al. | |
| 2004/0136379 A1 | 7/2004 | Liao et al. | |
| 2004/0208183 A1 | 10/2004 | Balachandran et al. | |
| 2005/0021621 A1 | 1/2005 | Welch et al. | |
| 2005/0122906 A1 | 6/2005 | Yazaki et al. | |
| 2005/0195845 A1 | 9/2005 | Mayhew et al. | |
| 2005/0249220 A1 * | 11/2005 | Olsen et al. ................ | 370/395.4 |
| 2007/0153690 A1 * | 7/2007 | Stanwood et al. ............ | 370/230 |

OTHER PUBLICATIONS

Copending U.S. Appl. No. 11/433,364, filed May 15, 2006 entitled "Weight-Based Bandwidth Allocation for Network Traffic" by Qingming Ma, 43 pages.

\* cited by examiner

*Primary Examiner* — Ricky Ngo
*Assistant Examiner* — Iqbal Zaidi
(74) *Attorney, Agent, or Firm* — Harrity & Harrity, LLP

(57) ABSTRACT

A network device may implement packet scheduling with administrator-configurable packet scheduling policies. In one implementation, the network device includes a filter component configured to assign priority levels to data units, the priority levels defining traffic classes for the data units. The network device may also include a scheduler component configured to schedule transmission of the traffic classes based on an assignment of weights to the traffic classes using at least one bandwidth allocation policy that exhibits a bandwidth allocation profile that varies based on one or more parameters of the bandwidth allocation policy that are configurable by an administrator.

20 Claims, 10 Drawing Sheets

WEIGHT-BASED BANDWIDTH ALLOCATION FOR NETWORK TRAFFIC

RELATED APPLICATION

This application is a continuation of U.S. patent application Ser. No. 11/433,364, filed May 15, 2006, the entire contents of which are incorporated herein by reference.

BACKGROUND OF THE INVENTION

A. Field of the Invention

Concepts described herein relate generally to network traffic flow, and more particularly, to weight-based bandwidth allocation for different classes of service in a network.

B. Description of Related Art

In an increasingly networked world, more and more traffic, such as data, voice, and video, is transmitted over public and proprietary networks. When routing traffic through the network, it is desirable to be able to assign different types of traffic different priorities as the traffic traverses the network. Some applications require stringent limits on end-to-end traffic delay while other applications require minimal bandwidth guarantees. For example, because streaming video and voice data, when it is delayed, can result in a noticeable degradation in quality to the end-user, it may be desirable to assign this type of traffic a higher priority than other traffic.

In Internet Protocol (IP) packet-based networks, each packet may include a header section, a portion of which may be used to indicate the traffic class to which the packet is assigned. A router at the edge of a network may set the traffic class for a packet. Routers in the core of the network may handle the traffic based on the set class. More specifically, a router may allocate network resources (such as bandwidth) to traffic classes within the router based on predetermined bandwidth allocation policies. Typically, within the router, packets of different traffic queues that are routed to the same output port share the link resources of the output port. When the incoming traffic data rate exceeds the output port link capacity, the packets may be buffered and the bandwidth allocation policies applied.

One known set of techniques for allocating bandwidth are weight-based scheduling techniques, such as the so-called Weighted Fair Queuing (WFQ) and Weighted Deficit Round Robin (WDRR) techniques. In these techniques, a weight is assigned to each traffic class. The weight assigned to a traffic class determines how often the traffic class should be served provided that packets are available to be sent. In other words, the weight associated with a traffic class determines the portion of bandwidth allocated to the traffic class.

One problem with known weight-based bandwidth allocation techniques is that they do not define how to assign weights and they may not be flexible enough for different situations. For example, in one situation, an administrator may wish to configure the router to support strict priority allocation in which higher priority traffic classes are always served over lower priority classes. In another situation, the administrator may wish to configure the router to support relative priority in which different traffic classes may not necessarily be served with strict priority relative to one another.

There is a need in the art to implement more flexible weight-based bandwidth allocation techniques.

SUMMARY

In one aspect, a network device includes a filter component configured to assign priority levels to data units, the priority levels defining traffic classes for the data units. The network device further includes a scheduler component configured to schedule transmission of the traffic classes based on an assignment of weights to the traffic classes using at least one bandwidth allocation policy that exhibits a bandwidth allocation profile that varies based on one or more parameters of the bandwidth allocation policy that are configurable by an administrator.

In another aspect, a method includes assigning priority levels to data units, the priority levels defining traffic classes for the data units. The method further includes scheduling transmission of the traffic classes based on an assignment of weights to the traffic classes using at least one bandwidth allocation policy that exhibits a bandwidth allocation profile that varies based on one or more parameters that are configurable by an administrator. Further, the method includes transmitting the data units in an order corresponding to the assigned weights.

Another aspect is directed to a network device. The network device includes logic to receive data from a first physical link; logic to processes the data to determine destination information for the data; and logic to transmit the data on a second physical link in accordance with the destination information, an order of transmission of the data being prioritized according to a bandwidth allocation policy. The bandwidth allocation policy being selected from a first bandwidth allocation policy or a second bandwidth allocation policy. In the first bandwidth allocation policy, weights associated with priority classes of the data are assigned based on first parameters entered by an administrator and in which two adjacent priority classes have a same weight difference as any two other adjacent priority classes. In the second bandwidth allocation policy, weights associated with the priority classes of the data are distributed based on second parameters entered by an administrator and in which two adjacent priority classes have a same weight ratio as any two other adjacent priority classes.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

As described herein, a network device may implement packet scheduling with administrator configurable packet scheduling policies. By setting a relatively few number of parameters, the administrator can exercise fine control of bandwidth allocation dictated by the packet scheduling policies.

Exemplary System Overview

Figure 1:
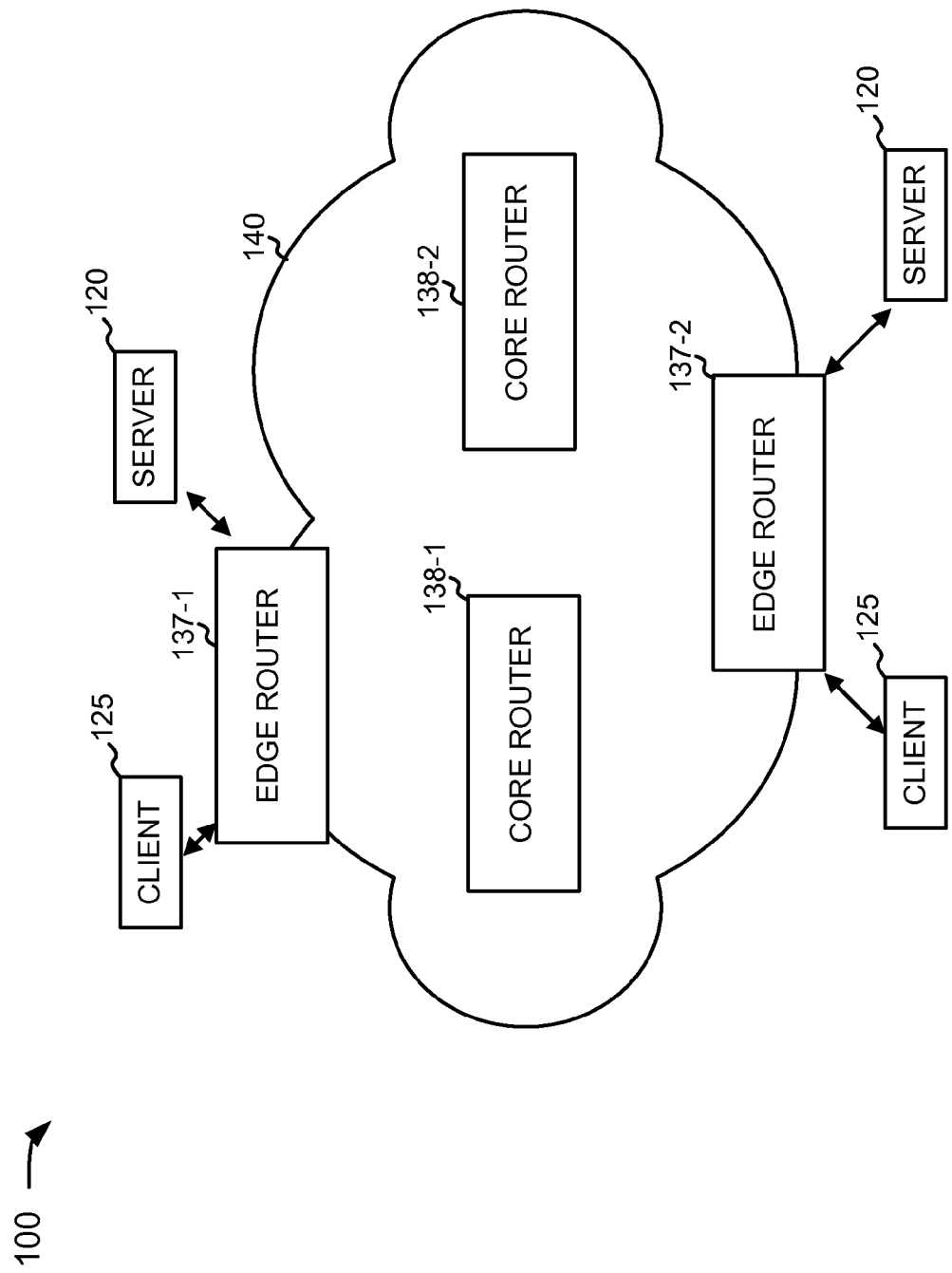
FIG. 1 is an exemplary diagram of a system in which concepts consistent with the principles of the invention may be implemented.

FIG. 1 is an exemplary diagram of a system 100 in which concepts consistent with the principles of the invention may be implemented. System 100 may include multiple entities, such as one or more servers 120 and one or more clients 125. Servers 120 may include one or more computing devices designed to provide information or to otherwise interact with clients 125. Similarly, clients 125 may each include one or more computing devices designed to interact with and obtain content from servers 120 or with other clients 125.

Clients 125 and servers 120 may communicate via a network 140. Network 140 may include a wide area network (WAN), such as the Internet, a private WAN, or a combination of the Internet and a private WAN, that is used to transport data to servers 120 and clients 125.

Network 140 may include a number of network devices, such as edge routers 137-1 and 137-2, and core routers 138-1 and 138-2. Edge routers 137 may generally function to connect devices, such as clients 125 or servers 120 to network 140. Core routers 138 may function to transmit data between other routers within network 140. In addition to simply routing data, edge routers 137 and core routers 138 may support other "value added" functions, such as quality of service (QoS) features and specialized security functions, such as IPsec (IP security) encryption. In these situations one or more of core routers 138 and/or edge routers 137 may be configured to satisfy a traffic contract in which a minimum QoS is guaranteed for packets within a specified flow or stream.

One of ordinary skill in the art will appreciate that, in practice, system 100 may include other network devices. Additionally, although network 140 is primarily described herein as an IP-based network, network 140 could also be an ATM-based network, a frame relay-based network, or a combination of such networks.

Figure 2:
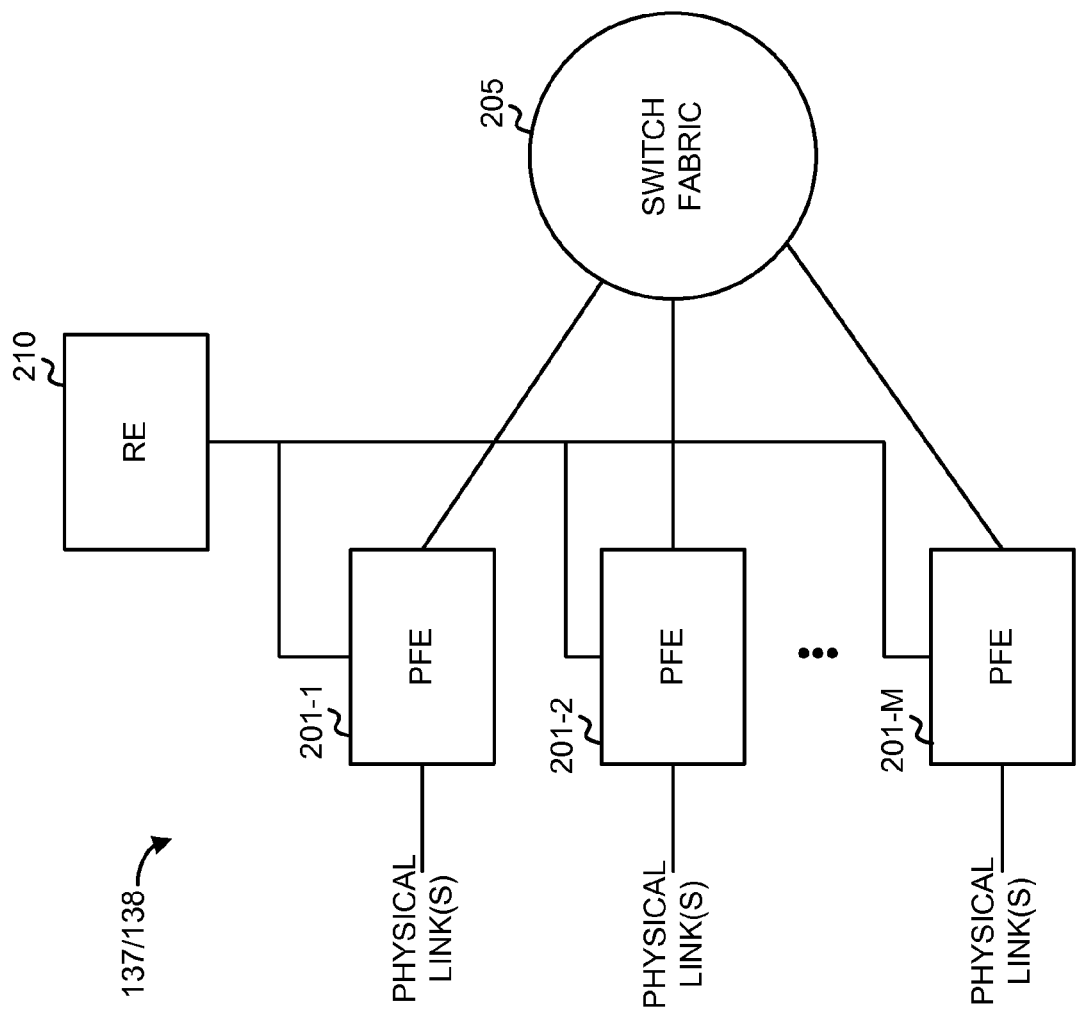
FIG. 2 is a block diagram illustrating a high-level exemplary implementation of one of the edge routers or core routers shown in FIG. 1.

FIG. 2 is a block diagram illustrating a high-level exemplary implementation of one of edge routers 137 or core routers 138, referred to as router 137/138 herein. Router 137/138 may include packet forwarding engines (PFEs) 201-1 through 201-M (collectively referred to as PFEs 201), an internal switch fabric 205, and a routing engine (RE) 210. Router 137/138 may receive data from physical links, process the data to determine destination information, and transmit the data out on a link in accordance with the destination information.

RE 210 may perform high level management functions for router 137/138. For example, RE 210 may communicate with other networks and systems connected to router 137/138 to exchange information regarding network topology. RE 210 may create routing tables based on the network topology information and forward the routing tables to PFEs 201. PFEs 201 use the routing tables to perform route lookup for incoming data. RE 210 may also perform other general control and monitoring functions for router 137/138.

PFEs 201 may each connect to each other via switch fabric 205. Switch fabric 205 provides internal links between different PFEs 201. In general, PFEs 201 receive data on ports connecting physical links that lead to network 140. Each physical link could be one of many types of transport media, such as optical fiber or Ethernet cable. The data on the physical link may be formatted according to one of several protocols, such as the synchronous optical network (SONET) standard. PFEs 201 process the received data, determine the correct output port for the data, and transmit the data on the physical link corresponding to the determined output port.

Exemplary Determination of Priority

Packets traversing a network may be assigned to various priority classes (also called traffic classes herein) and then allocated bandwidth differently based on the priority classes. For IP packets, the IP header portion of the packet is frequently set to indicate the priority level of the packet.

Figure 3:
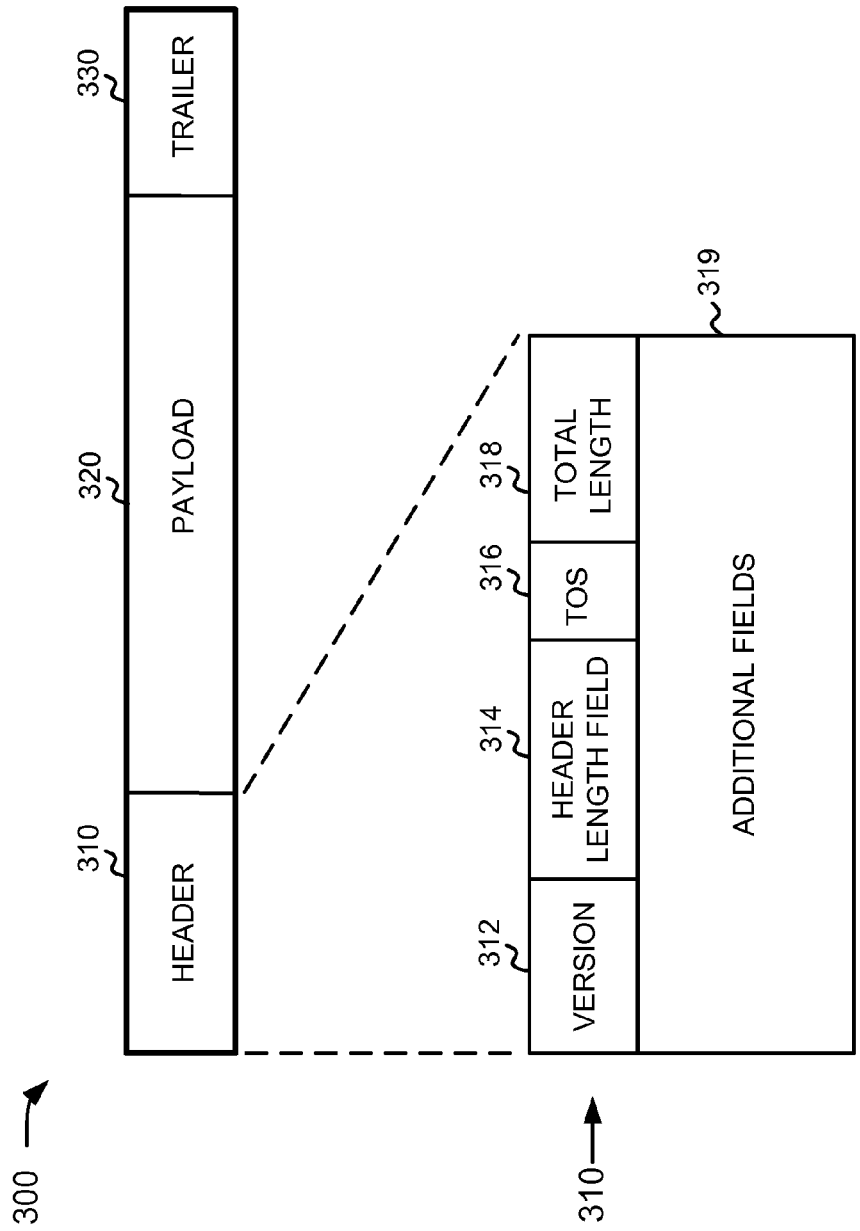
FIG. 3 is a diagram illustrating an exemplary composition of a packet.

FIG. 3 is a diagram illustrating an exemplary composition of a packet 300. Packet 300 may include a header portion 310, a payload portion 320, and a trailer portion 330. Typically, header portion 310 contains the information needed to get the packet from the source to the destination, payload 320 contains the substantive information that is to be carried by the packet, and trailer portion 330 contains information used to ensure that that errors do not occur during transmission of packet 300.

Header portion 310 may contain a number of different fields, including, as is shown in FIG. 3, version field 312, header length field 314, Type of Service (TOS) field 316, total length field 318, and additional fields 319. Version field 312 may indicate the format of packet 300, such as an IPv4 packet or an IPv6 packet. Header length field 314 may indicate the length of the header. TOS field 316 provides an indication of the priority that is to be assigned to the packet. Total length field 318 may indicate the total length of the packet. Additional fields 319 represent a number of additional fields that may be included in header portion 310. These fields will not be described in additional detail herein.

TOS field 316 can be used to determine the priority of the packet relative to other packets traversing the network. TOS field 316 may be an eight bit field, of which the first three bits, called the precedence bits, may be used to assign a priority value (or level). In some existing routers, the precedence bits are used to form a priority value that the router uses to enforce strict priority. With strict priority, packets of a higher priority level are always given preference over packets with a lesser priority level.

In other existing routers, the precedence bits may be used with Differentiated Services techniques to allow more sophisticated bandwidth control using Differentiated Service Code Points (DSCPs). DSCPs contain six bits, of which the first three bits (three precedence bits in TOS) are used to determine a traffic class and the rest are used to determine drop preference. In Differentiated Services, the first three bits of DSCP may represent the relative priority level of different traffic classes. For example, a traffic class with the first three bits of value five may not necessarily be served with strict priority over the traffic class with the first three bits having the value four. Existing DSCP standards tend to not specify how to determine relative priority.

Bandwidth Allocation

Aspects of the invention provide for flexible allocation of bandwidth in a router or switch. An administrator of the router or switch, by setting a relatively few number of parameters, can exercise fine control of relative priority policies of the bandwidth allocation at the router.

Figure 4:
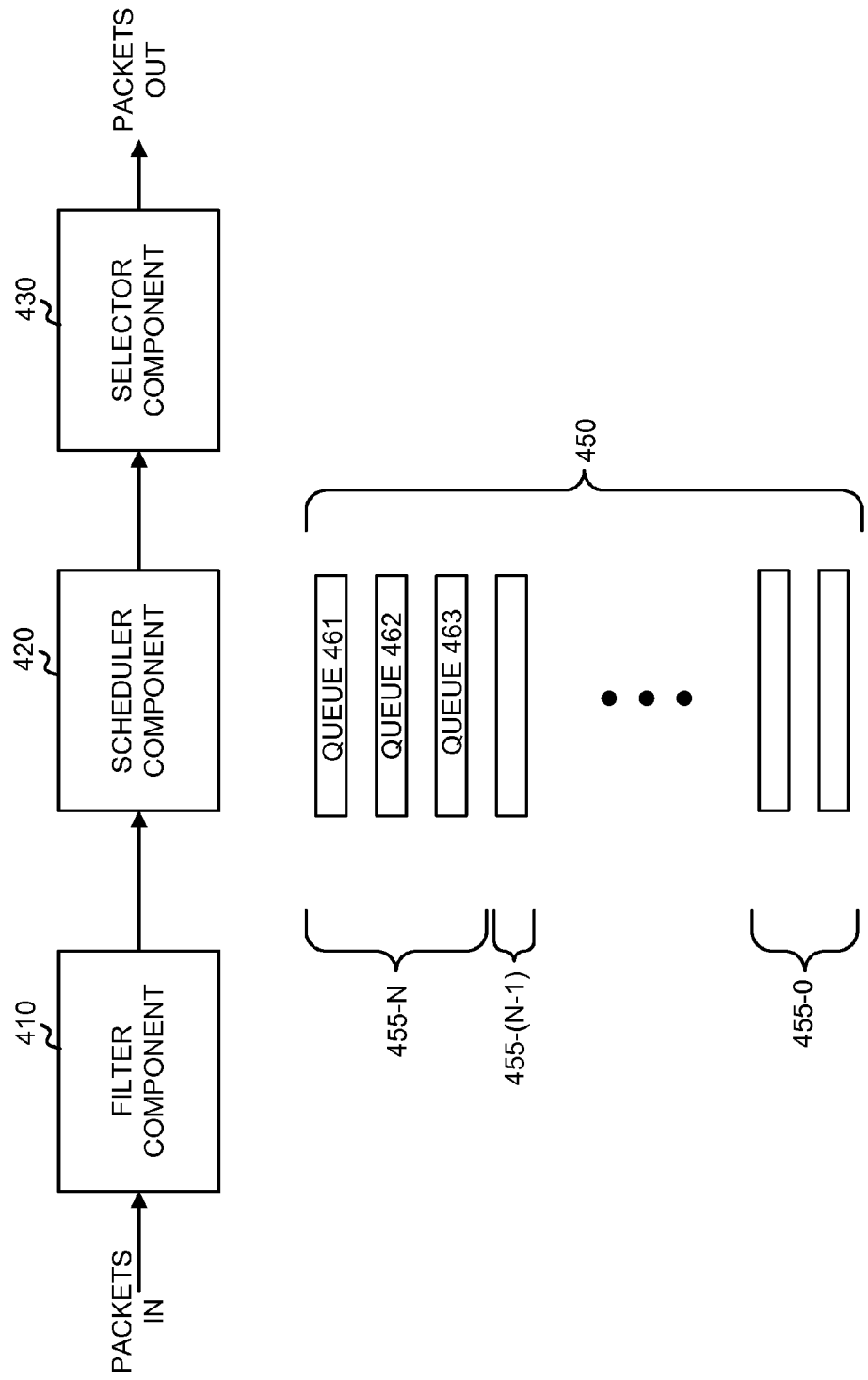
FIG. 4 is a diagram conceptually illustrating exemplary components for allocating bandwidth in a network device.

FIG. 4 is a diagram conceptually illustrating exemplary components for allocating bandwidth in a network device. In practice, the elements shown in FIG. 4 may be implemented in, for example, router 137/138, such as within a PFE 201 of router 137/138.

As shown in FIG. 4, the router may include a filter component 410, a scheduler component 420, and a selector component 430. In general, these components may act to determine priority for incoming packets and schedule transmission of the packets based on the determined priority relative to the priority of other packets. Although bandwidth allocation will be described as operating on packets, more generally, the techniques described herein may be applied to frames, cells, or other data units in a network device. Additionally, instead of receiving a complete packet at filter component 410, filter component 410 may only receive header 310 of the packet, a portion of header 310, or some other data structure relating to the header of the packet. In this situation, the remainder of the packet may be stored in a different memory and then combined with an appropriate header before being transmitted.

Filter component 410 may assign a priority level to incoming packets based on, for example, TOS field 316 of the packet, or other information associated with the packet, such as the output port of the packet. The priority level of a packet may define its traffic class. In one implementation, filter component 410 may use the first three bits of TOS field 316 to generate a priority level between the values of zero and seven. Other information associated with the packet may also be used to influence the priority level of the packet, such as the source of the packet or the destination of the packet.

Scheduler component 420 may assign the packets output from filter 410 to an appropriate queue. A queue may store packets (or pointers to packets) of a particular traffic class or of a particular traffic class that is destined for a particular output port. A number of exemplary queues 450 are shown in FIG. 4. Multiple queues may be implemented for a single traffic class. This is illustrated in FIG. 4 by sets of queues 455-0 through 455-N, where each of the N+1 sets may include zero or more queues. For example, priority class 455-N (i.e., the queues having priority level N, the highest priority level) is shown as including three distinct queues, labeled as queues 461 through 463. In an implementation in which the first three bits of TOS field 316 are used to assign priority, N may equal seven, giving eight distinct priority classes. Multiple queues may correspond to a single priority class. In situations in which multiple queues exist for a single traffic class, each of the different queues, such as queues 461, 462, and 463, may correspond to a different physical link or a different output port in a PFE 201.

In practice, a single queue may be dedicated to a particular packet flow, stream, or other logical grouping of traffic. Each of queues 450 may be implemented as first-in-first-out (FIFO) queues.

Additionally, each queue within a traffic class set 455 may be associated with a weight. The weights assigned to the queues may used to implement weighted bandwidth allocation. For example, each weight may represent the portion of the available bandwidth that is to be allocated to the queue.

Scheduler component 420 may assign the weights to the queues. Scheduler component 420 may periodically or intermittently update the weights for queues 450, such as whenever there is a change in the active queues or traffic classes. In one implementation, the weights may be assigned based on weighting policies that are configured by an administrator. Consistent with an aspect of the invention, through the selection of a relatively few parameters, an administrator may configure router 137/138 to support one or more relative priority policies.

Selector component 430 may determine which queues to serve (i.e., the queue from which to dequeue a packet) based on the weights assigned to each of the queues. For example, the total weight of a link may be apportioned to the queues associated with the link in proportion to their weights.

A number of different possible weight assignment policies will next be described with reference to FIGS. 5-9. Scheduler component 420 may assign the queue weights based on these policies.

Equal Difference Series Weight Assignment

Scheduler component 420 may assign weights using a weight assignment policy that will be called an "equal difference series policy" herein. With this policy, two adjacent priority classes will have the same weight "distance" between one another, which, depending on the application, may be a useful technique for providing for relative priority between traffic classes.

The equal difference series policy will be described in detail with reference to FIGS. 5 and 6.

Figure 5:
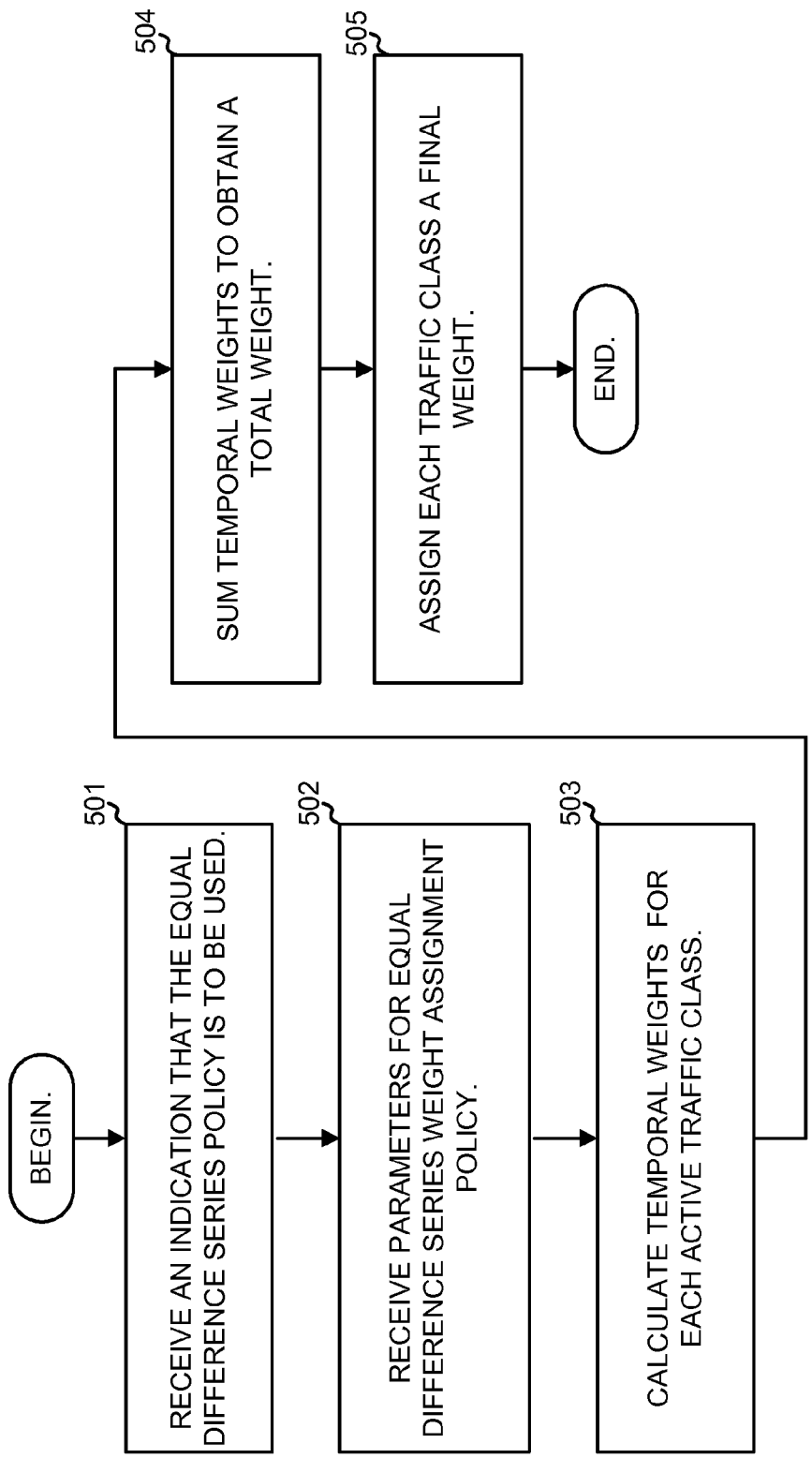
FIG. 5 is a flow chart illustrating acts that may be performed in assigning weights based on the equal difference policy.

FIG. 5 is a flow chart illustrating acts that may be performed in assigning weights based on the equal difference series policy. Scheduler component 420 may initially receive an indication that the equal difference series policy is to be used (act 501). An administrator of router 137/138 may, for instance, configure parameters in router 137/138 to indicate that this weight assignment policy is desired. Scheduler component 420 may also receive parameters for this weight assignment policy (act 502). Specifically, two parameters, called b and d herein, may be used to define the equal difference series policy. The bandwidth allocation profile of the equal difference series policy varies based on the values of b and d.

Parameter b is called the base and parameter d is called the difference. For each traffic class marked with a specific priority level, denoted as pri(class), a temporal weight, tweight, is calculated (act 503). The temporal weight may be defined as:

$$b + pri(\text{class}) \cdot d \quad \text{(Eq. 1)}.$$

The temporal weights may be summed for all active classes to obtain a total weight, W (act 504). In other words, $$W = \Sigma_{\forall active(class)} b + pri(\text{class}) \cdot d \quad \text{(Eq. 2)}.$$

Each active class may then be assigned a final weight, defined as the temporal weight of the class divided by the total weight (act 505). Formally, the final weight for a traffic class is:

$$\frac{b + pri(\text{class}) \cdot d}{W}. \quad \text{(Eq. 3)}$$

Figure 6:
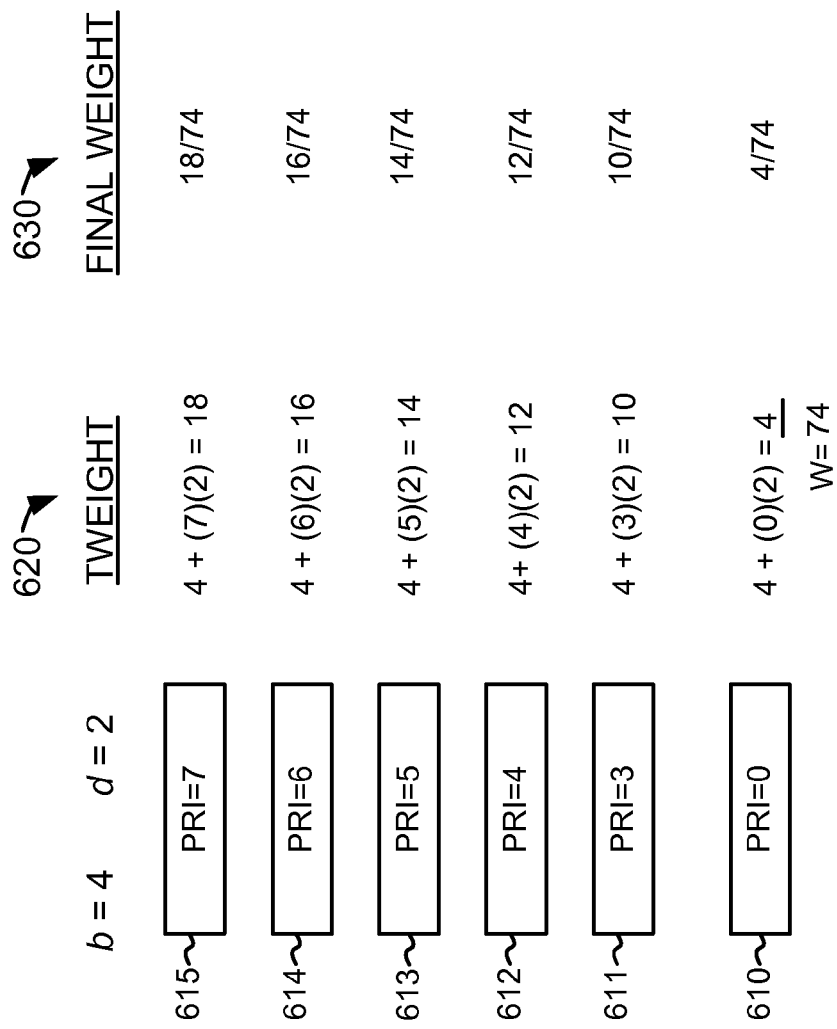
FIG. 6 is a diagram conceptually illustrating assigning of weights for an exemplary set of parameters based on the acts shown in FIG. 5.

FIG. 6 is a diagram conceptually illustrating assigning of weights for an exemplary set of parameters based on the acts shown in FIG. 5. In this example, b is set to four and d is set to two. Six queues are shown, each corresponding to a different priority class. Specifically, queue 610 has a priority value of zero, queue 611 has a priority value three, queue 612 has a priority value of four, queue 613 has a priority value of five, queue 614 has a priority value of six, and queue 615 has a priority value of seven. Queue 615 is the highest priority queue while queue 610 is the lowest. The temporal weights (Eq. 1) for queues 610 through 615 are illustrated in column 620. The total weight, W, is 74. The total weight does not include temporal weight values for priority values one and two because no queues correspond to this weight. The final weights for queues 610 through 615 are shown in column 630. It can be observed that the difference between any two weights that correspond to adjacent priority classes is a constant (i.e., 2/74 in this example).

A special case of the equal difference series policy can be observed when b is set equal to d. In this situation, a traffic class with priority i gets the weight:

$$\text{weight(class)} = \frac{(pri(\text{class}) + 1)}{\sum_{\forall active(class)} (pri(\text{class}) + 1)}. \quad \text{(Eq. 4)}$$

Intuitively, this situation can be thought of as dividing the link bandwidth into an aggregate priority number of shares, where each traffic class is assigned a weight which is proportional to the priority of the traffic class.

Equal Ratio Series Weight Assignment

Scheduler component 420 may assign weights using a weight assignment policy that will be called an "equal ratio series policy" herein. With this policy, higher priority traffic may be allocated an increasing portion of the bandwidth without starving lower priority traffic. Further, two adjacent priority classes have the same weight ratio between one another. This may be useful in the situation such as when it is desired that a traffic class with priority seven take most of the bandwidth while leaving some, but a very little portion, of the bandwidth to traffic classes with a priority lower than seven.

The equal ratio series policy will next be described in detail with reference to FIGS. 7 and 8.

Figure 7:
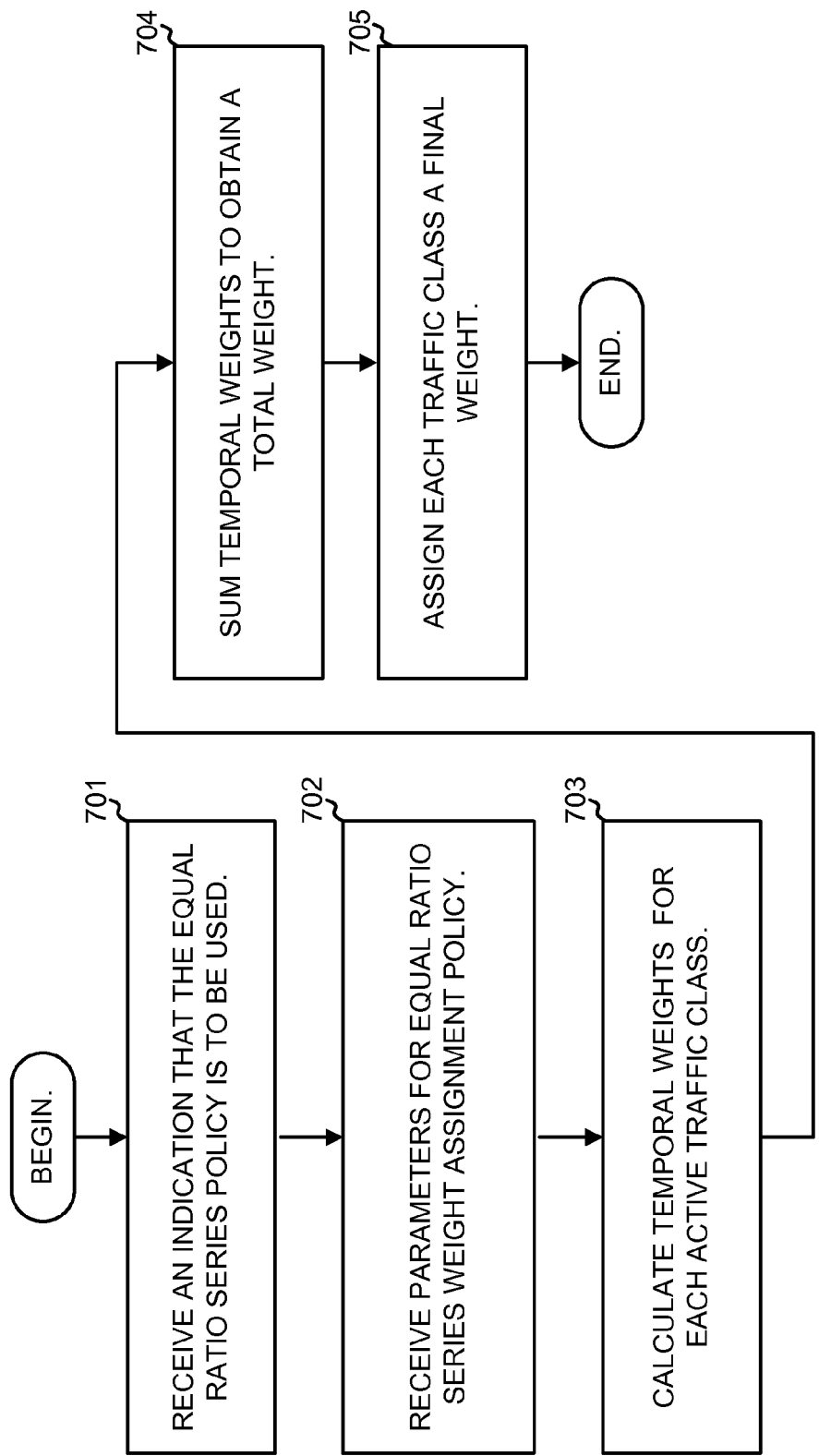
FIG. 7 is a flow chart illustrating acts that may be performed in assigning weights based on the equal ratio policy.

FIG. 7 is a flow chart illustrating acts that may be performed in assigning weights based on the equal ratio series policy. Scheduler component 420 may initially receive an indication that the equal ratio series weight assignment policy is to be used (act 701). An administrator of router 137/138 may, for instance, configure parameters in router 137/138 to indicate that this weight assignment policy is desired. Scheduler component 420 may receive the parameters for this weight assignment policy (act 702). Specifically, two parameters, called a and q herein, may be used to define the equal ratio series weight assignment policy. The bandwidth allocation profile of the equal ratio series policy varies based on the values of a and q.

For each traffic class marked with a specific priority level, denoted as pri(class), a temporal weight, tweight, is calculated (act 703). The temporal weight is defined as:

$$a \cdot q^{pri(class)} \quad \text{(Eq. 5)}.$$

The temporal weights may be summed for all active classes to obtain a total weight, W (act 704). In other words, $$W = a \cdot \sum_{\forall active(classs)} q^{pri(class)} \quad \text{(Eq. 6)}.$$

Each active class may then be assigned a final weight, defined as the temporal weight of the class divided by the total weight (act 705). Formally, the final weight is:

$$\frac{a \cdot q^{pri(class)}}{W} = \frac{q^{pri(class)}}{\sum_{\forall active(class)} q^{pri(class)}}. \quad \text{(Eq. 7)}$$

Figure 8:
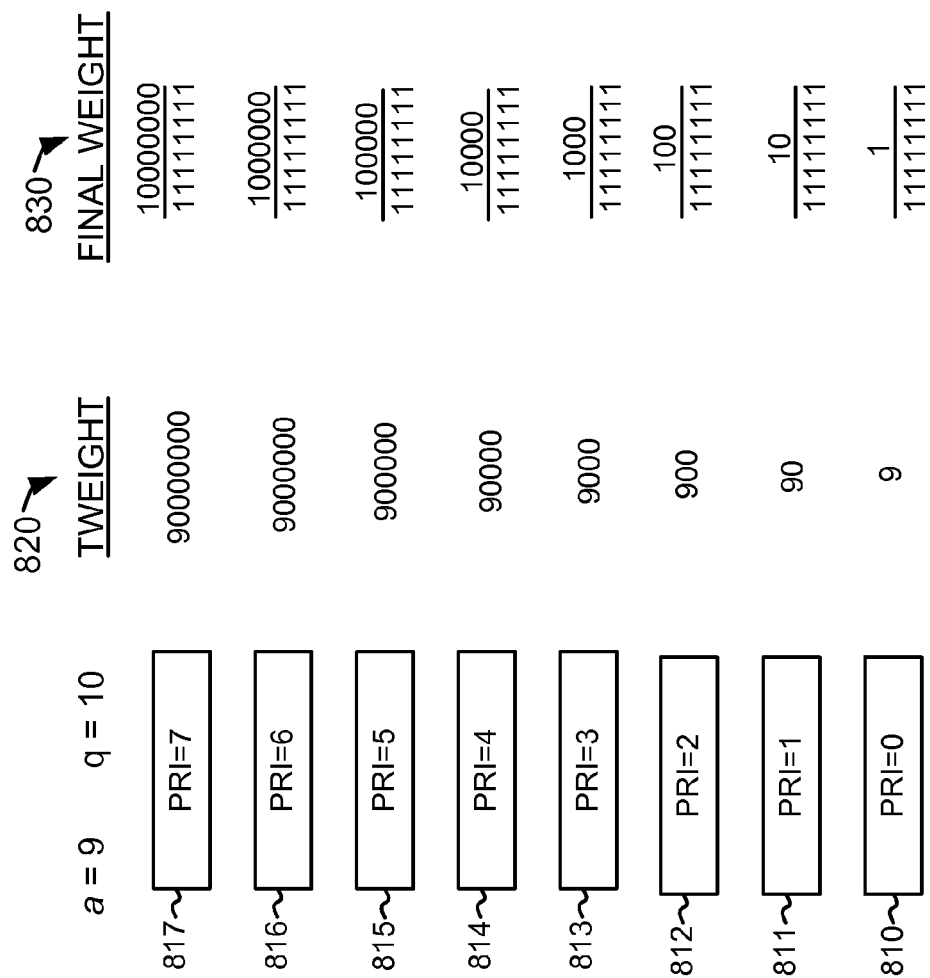
FIG. 8 is a diagram conceptually illustrating assigning of weights for an exemplary set of parameters based on the acts shown in FIG. 7.

FIG. 8 is a diagram conceptually illustrating assigning of weights for an exemplary set of parameters based on the acts shown in FIG. 7. In this example, a is set to nine and q is set to ten. Eight queues are shown, each corresponding to a different priority class. Specifically, queue 810 has a priority value of zero, queue 811 has a priority value one, queue 812 has a priority value of two, queue 813 has a priority value of three, queue 814 has a priority value of four, queue 815 has a priority value of five, queue 816 has a priority value of six, and queue 817 has a priority value of seven. Accordingly, queue 817 is the highest priority queue while queue 810 is the lowest. The temporal weights for queues 810 through 817 are illustrated in column 820. The total weight is approximately 11,111,111. The final weights for queues 810 through 817 are shown in column 830.

Essentially, the traffic queue with priority seven obtains more than 90% of the bandwidth as long as it has packets to send, while all other traffic classes share the remaining 10% of the bandwidth. This effectively gives priority to the higher priority traffic classes without starving the lower priority classes. Increasing q tends to give higher priority traffic a more strict preference over lower priority traffic. In other words, the higher the value of q, the more strict the preference of higher priority queues over lower priority queues. At very high values of q, this policy tends to emulate a strict priority policy, in which lower priority queues are not served as long as a higher priority queue has traffic.

Hybrid Weight Assignment

In some situations, it may be desirable to group traffic classes. A first bandwidth allocation policy may be applied at the group level, and within each group, a different bandwidth allocation policy may be applied between the traffic classes in the group. The use of multiple bandwidth allocation policies in this manner will be called "hybrid weight assignment" herein.

Figure 9:
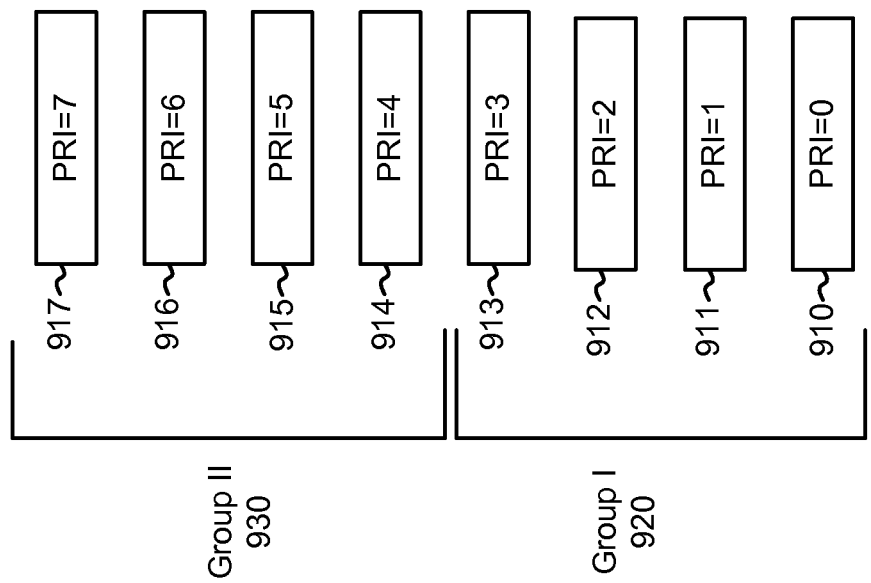
FIG. 9 is a diagram illustrating concepts consistent with hybrid weight assignment.

FIG. 9 is a diagram illustrating concepts consistent with hybrid weight assignment. Eight queues, labeled as queues 910 through 917, are shown in FIG. 9, corresponding to priority classes zero through seven. Queues 910 through 913 (priority classes zero through three) are grouped into a first group 920 and queues 914 through 917 (priority classes four through seven) are grouped into a second group 930. This grouping may be performed, because, for example, it may be desired that bandwidth be allocated using a combination of both equal difference series weight assignment policies and equal ratio series weight assignment policies.

Referring to the example in FIG. 9, three separate instances of the equal difference series/equal ratio series policies are applied to create a hybrid policy. For example, the equal difference series policy may be applied to group I 920 and group II 930. That is, an instance of the equal difference series policy may be applied to two "traffic classes" (groups I and II) to obtain portions of the total bandwidth dedicated to the queues in groups I and II. The group I 920 portion may then be further allocated among queues 910-913 (four traffic classes) based on another application of the equal difference series or equal ratio series policies. Similarly, the group II 930 portion may be further allocated among queues 914-917 (four traffic classes) based on yet another application of the equal difference series or equal ratio series policies. In this manner, by using a hybrid weight assignment policy, an administrator can exercise greater control of the weights assigned to the traffic classes than with either an equal ratio series policy or equal difference series policy applied individually.

The application of the hybrid policy shown in FIG. 9 is one example of the hybrid policy. More generally, there are four general situations in which the hybrid policy may be applied. Each of these four situations will now be discussed and will be called case one through case four, respectively.

In case one, the queues within each group may use the equal difference series policy while the policy applied among groups is the equal ratio series policy. All the queues form the different groups are first lumped together and the equal ratio series policy is applied to obtain a first weight for each queue. A weight is then obtained for each group by summing the first weights for all of the queues within each group. For each individual group, the equal difference series policy is also applied to obtain a second weight for each queue in the group. The weight obtained for each group may then be multiplied by the second weight for each queue to obtain the final weight for each queue.

In case two, the queues within each group may use the equal ratio series policy while the policy applied among groups is the equal difference series policy. All the queues from the different groups are first lumped together and the equal difference series policy is applied to obtain a first weight for each queue. A weight is then obtained for each group by summing the first weights for all of the queues within each group. For each individual group, the equal ratio series policy is also applied to obtain a second weight for each queue in the group. The weight obtained for each group may then be multiplied by the second weight for each queue to obtain the final weight for each queue.

Case three is a special case of case one in which there are two groups. The group with high priority queues uses the equal ratio series policy and the group with lower priority queues uses the equal difference series policy. For this policy, use the technique discussed above for case one to obtain the weight for each queue, but treat each queue in the high priority group as a separate group (each having one queue). For example, assume a high priority group including three queues and a lower priority group having four queues. The final weights for each of the seven queues is obtained by applying the techniques for case one in which four groups are used by assuming that each of the three queues in the higher priority group are separate queues.

Case four is a special case of case two in which there are two groups. The group with high priority queues uses the equal difference series policy and the group with lower priority queues uses the equal ratio series policy. For this policy, use the technique discussed above for case two to obtain the weight for each queue, but treat each queue in the high priority group as a separate group (each having one queue). For example, assume a high priority group including three queues and a lower priority group having four queues. The final weights for each of the seven queues is obtained by applying the techniques for case two in which four groups are used by assuming that each of the three queues in the higher priority group are separate queues.

Exemplary Interface for Setting Bandwidth Allocation Policies

Whether to use the equal difference series, equal ratio series, or hybrid policy may be a configurable by an administrator or other user of the network device that implements the policies. The network administrator may, for example, manage the network device remotely by connecting to the network device via a telnet or web session. The administrator may then configure the network device to implement the desired network bandwidth allocation policies.

Figure 10:
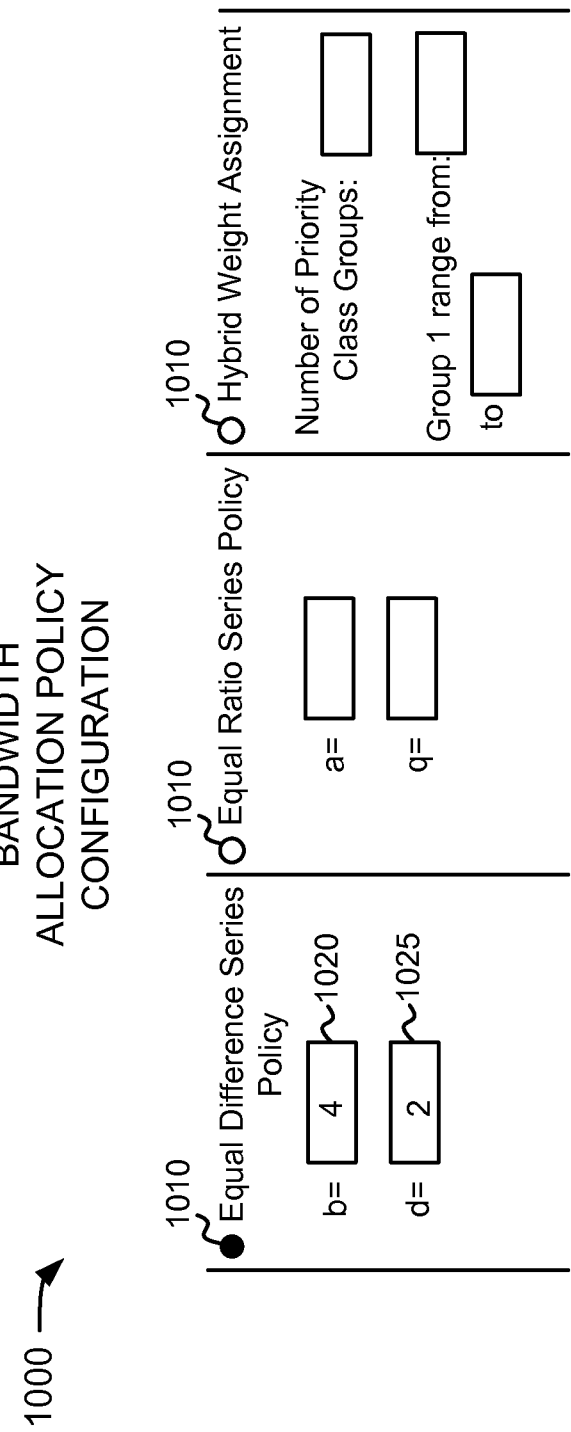
FIG. 10 is a diagram illustrating an exemplary interface presented by a network device for configuring its bandwidth allocation policies.

FIG. 10 is a diagram illustrating an exemplary interface presented by a network device for configuring its bandwidth allocation policies. In this example, assume that the administrator has logged into the device using a web browser via an HTTP connection. The network device may present an interface 1000 through which the administrator can configure the network device. In the example interface 1000, selection buttons 1010 are used to allow the administrator to select the bandwidth allocation policy that the administrator would like to use. After selecting a bandwidth allocation policy, the administrator may enter the parameters appropriate for the selected bandwidth allocation policy. For example, if the equal difference series policy is selected, the administrator may then enter the desired values for the b and d parameters in text boxes 1020 and 1025.

CONCLUSION

The foregoing description of exemplary embodiments of the invention provides illustration and description, but is not intended to be exhaustive or to limit the invention to the precise form disclosed. Modifications and variations are possible in light of the above teachings or may be acquired from practice of the invention.

For example, while a series of acts have been described with regard to FIGS. 5 and 7, the order of the acts may be varied in other implementations consistent with the invention. Moreover, non-dependent acts may be implemented in parallel.

It will also be apparent to one of ordinary skill in the art that aspects of the invention, as described above, may be implemented in many different forms of network topologies, software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" or as a "component" that performs one or more functions. This logic or component may include hardware, such as an application specific integrated circuit or a field programmable gate array, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A method comprising:
   allocating, by a network device, received data units to a plurality of traffic classes;
   selecting, via the network device, at least one of a plurality of bandwidth allocation policies, the plurality of bandwidth allocation policies including:
a first bandwidth allocation policy that includes a pair of weights having respective corresponding weight differences,
a second bandwidth allocation policy that includes a pair of weights having respective corresponding weight ratios, and
a hybrid bandwidth allocation policy that includes applying the first bandwidth allocation policy to two or more pairs of traffic classes, of the plurality of traffic classes, and applying the second bandwidth allocation policy to two or more other pairs of traffic classes, of the plurality of traffic classes;
assigning, by the network device, respective weights to the plurality of traffic classes based on the selected at least one bandwidth allocation policy and one or more configurable parameters, assigning the respective weights including:
determining a first pair of weights to be assigned to an adjacent pair of the plurality of traffic classes, and
determining, based on a mathematical relationship associated with the first pair of weights, second pairs of weights to be assigned, respectively, to other adjacent pairs of the plurality of traffic classes; and
forwarding the received data units based on the assigned weights.

2. The method of claim 1, where the hybrid bandwidth allocation policy;
applies the first bandwidth allocation policy to two or more pairs of adjacent traffic classes, of the plurality of traffic classes, and
applies the second bandwidth allocation policy to another two or more pairs of adjacent traffic classes, of the plurality of traffic classes.

3. The method of claim 1, further comprising:
assigning priority levels to the received data units based on bits within a Type of Service (TOS) field obtained from a header of the received data units, and
where allocating the received data units to the plurality of traffic classes is further based on the assigned priority levels.

4. The method of claim 1, further comprising:
determining a change in a number of active traffic classes, of the plurality of traffic classes; and
updating the weights for the traffic classes when there is a change in a number of active traffic classes.

5. The method of claim 1, where at least one of:
the first bandwidth allocation policy includes two adjacent traffic classes, or
the second bandwidth allocation policy includes two adjacent traffic classes.

6. A non-transitory computer readable medium storing instructions, the instructions comprising:
one or more instructions which, when executed by a processor of a computer device, cause the processor to:
assign priority levels to data units,
the priority levels defining traffic classes for the data units; assign weights to the traffic classes using a plurality of bandwidth allocation policies,
the plurality of bandwidth allocation policies including:
at least one of:
a first bandwidth allocation policy that includes two traffic classes, of the traffic classes, having weight difference that corresponds to other weight differences associated with, respectively, two other traffic classes, of the traffic classes, or
a second bandwidth allocation policy that includes two traffic classes having a weight ratio that corresponds to other weight ratios associated with, respectively, another two other traffic classes, of the traffic classes, and
a hybrid bandwidth allocation policy that includes assigning weights, associated with two or more of the traffic classes, based on the first bandwidth allocation policy and the second bandwidth allocation policy, and
at least one bandwidth allocation policy, of the plurality of bandwidth allocation policies, including a bandwidth allocation profile that varies based on one or more parameters,
the least one bandwidth allocation policy including assigning the weights such that a first mathematical relationship between first weights, associated with two adjacent traffic classes, of the traffic classes, corresponds to a second mathematical relationship between second weights associated with another two adjacent traffic classes, of the traffic classes; and
schedule transmission of the traffic classes based on the assigned weights.

7. The non-transitory computer readable medium of claim 6, where at least one of:
the two traffic classes included in the first bandwidth allocation policy are adjacent traffic classes, or
the two traffic classes included in the second bandwidth allocation policy are adjacent traffic classes.

8. The non-transitory computer readable medium of claim 6, where the one or more instructions to assign the weights to the traffic classes include:
one or more instructions to assign the weights to two or more adjacent pairs of traffic classes based on the first bandwidth allocation policy; and
one or more instructions to assign the weights to another two or more adjacent pairs of traffic classes based on the second bandwidth allocation policy.

9. The non-transitory computer readable medium of claim 6, where the one or more parameters, of the at least one bandwidth allocation policy, are configurable by a user of the computer device.

10. The non-transitory computer readable medium of claim 6, where the instructions further include:
one or more instructions to transmit the data units in proportion to a weight, of the weights, associated with each of a plurality of queues to store the data units or pointers to the data units.

11. The non-transitory computer readable medium of claim 6, where
the data units include packets, and
the one or more instructions to assign the priority levels to the data units further include:
one or more instructions to assign the priority levels to the packets based on bits within a Type of Service (TOS) field obtained from a header of the packets.

12. The non-transitory computer readable medium of claim 6, where the one or more instructions to schedule the transmission of the traffic classes include:
one or more instructions to detect a change in an active traffic class; and
one or more instructions to update the weights for the traffic classes based on detecting the change in the active traffic class.

13. The non-transitory computer readable medium of claim 6, where the hybrid bandwidth allocation policy:

applies the first bandwidth allocation policy to two or more pairs of adjacent traffic classes, of the traffic classes, and applies the second bandwidth allocation policy to another two or more pairs of adjacent traffic classes, of the traffic classes.

14. A device comprising:

storage to store data units; and a processor to:

assign the data units to traffic classes, assign weights to the traffic classes using a plurality of bandwidth allocation policies, the plurality of bandwidth allocation policies including:

at least one of:

a first bandwidth allocation policy that includes two traffic classes, of the traffic classes, having a weight difference that corresponds to other weight differences associated with, respectively, two other traffic classes, of the traffic classes, or a second bandwidth allocation policy that includes two traffic classes having a weight ratio that corresponds to other weight ratios associated with, respectively, another two other traffic classes, of the traffic classes, and a hybrid bandwidth allocation policy that includes assigning weights, associated with two or more of the traffic classes, based on the first bandwidth allocation policy and the second bandwidth allocation policy, and at least one bandwidth allocation policy, of the plurality of bandwidth allocation policies, including a bandwidth allocation profile that varies based on one or more configurable parameters, the least one bandwidth allocation policy including assigning the weights such that a first mathematical relationship between first weights, associated with two adjacent traffic classes of the traffic classes, corresponds to a second mathematical relationship between second weights associated with another two adjacent traffic classes, of the traffic classes, and schedule transmission of the traffic classes based on the assigned weights.

15. The device of claim 14, where at least one of:

the two traffic classes included in the first bandwidth allocation policy are adjacent traffic classes, or the two traffic classes included in the second bandwidth allocation policy are adjacent traffic classes.

16. The device of claim 14, further comprising:

a plurality of queues to:

store the data units or pointers to the data units, each of the plurality of queues being associated with one of the weights, where the data units are transmitted from the device in proportion to the weight associated with respective ones of the data units stored in each of the plurality of queues.

17. The device of claim 14, where the data units include packets, and the processor, when assigning the data units to the traffic classes, is further to:

assign the data units to the traffic classes based on bits within a Type of Service (TOS) field obtained from a header of the packets.

18. The device of claim 14, where the device includes a router.

19. The device of claim 14, where the processor is further to:

detect changes in an active traffic class, of the traffic classes, and update the weights for the traffic classes based on detecting the change in the active traffic class.

20. The device of claim 14, where the hybrid bandwidth allocation policy:

applies the first bandwidth allocation policy to two or more pairs of adjacent traffic classes, of the traffic classes, and applies the second bandwidth allocation policy to another two or more pairs of adjacent traffic classes, of the traffic classes.

* * * * *